United States Patent Office
2,804,448
Patented Aug. 27, 1957

2,804,448

NOVEL METHOD FOR PREPARING RUBBERY CHLORINATED ISOOLEFIN-POLYOLEFIN INTERPOLYMER DERIVATIVES

Victor L. Hallenbeck, Cleveland, Ohio, assignor to The B. F. Goodrich Company, New York, N. Y., a corporation of New York No Drawing. Application June 1, 1954,
Serial No. 433,829

5 Claims. (Cl. 260—85.3)

This invention relates to a novel method of preparing chlorinated isoolefin-polyolefin rubber derivatives and relates more particularly to chlorination of rubbery isoolefin-polyolefin interpolymers with N-chlorohydantoins and the products obtained thereof.

A copending application of Richard T. Morrissey and Marvin R. Frederick, Serial No. 324,412, filed December 5, 1952, now U. S. Patent No. 2,732,354, describes rubbery chlorine-containing derivatives of isoolefin-polyolefin interpolymers which are prepared by chlorination at temperatures below 0° C., it having been found that chlorination of such interpolymers with chlorine itself at temperatures above 0° C. caused degradation of the interpolymer which is evidenced by a softening of the interpolymer, very poor physical properties of vulcanizates of the chlorinated interpolymer, and a failure of the chlorinated interpolymer to vulcanize when mixed with natural rubber.

It now has been found, quite unexpectedly, that rubbery isoolefin-polyolefin interpolymers may be chlorinated at temperatures as high as 300° F. with little apparent degradation of the polymer through use of N-chlorohydantoins. Chlorinated interpolymers obtained through the use of critical amounts of N-chlorohydantoins even at high temperatures by the procedure of this invention are not softened, have excellent adhesive and physical properties when vulcanized, and mixtures with natural rubber are readily vulcanized. In the practice of the invention, a hereinafter-defined amount of N-chlorohydantoin is mixed with a rubbery isoolefin-polyolefin interpolymer in an internal mixer or on a mill or other suitable mixing apparatus so as to obtain a homogeneous mixture of the N-chlorohydantoin in the interpolymer, and thereafter the mixture is heated to develop the chlorinated interpolymer derivative.

The novel process of this invention is applied to any of the isoolefin-polyolefin interpolymers described in the copending application mentioned hereinabove. Among these are, for example, the interpolymers of a major proportion of desirably from 70 to 99 weight percent of an isoolefin generally containing from 4 to 8 carbon atoms such as, most desirably, isobutylene or alternatively, 3-methyl butene-1, 4-methyl pentene-1, 2-ethyl butene-1, 4-ethyl pentene-1 or the like; or a mixture of such olefins with a minor proportion, desirably from 1 to 30 weight percent, of a polyolefinic hydrocarbon generally containing from 4 to 18 carbon atoms or 2, 3 or more such hydrocarbons including the following: (1) acyclic or open-chain conjugated diolefins such as butadiene-1,3 hydrocarbons as isoprene and the like, (2) acyclic non-conjugated diolefins such as dimethallyl and its homologs, (3) alicyclic diolefins, both conjugated and non-conjugated, such as cyclopentadiene, (4) acyclic triolefins, (5) alicyclic triolefins such as fulvene and (6) higher polyolefins such as tetraolefins and the like.

It is to be understood that in addition to the preferred materials set forth above, isoolefin-polyolefin interpolymers containing other interpolymerized monomers such as styrene, chlorostyrenes, alkyl styrenes, acrylyl chloride, methallyl chloride and other monoolefinic monomers also are advantageously used to prepare the desired chlorinated derivatives.

Any of the N-chlorohydantoins may be used in the process of this invention. The N-chlorohydantoins are represented by the formula

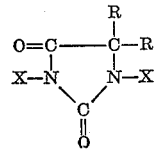

wherein the R's are hydrogen and alkyl radicals and X is hydrogen and chlorine. Preferred are mono- and dichloro-alkyl hydantoins wherein R is hydrogen or alkyl radicals containing from 1 to 8 carbon atoms and at least one R is alkyl. Particularly preferred is 1,3-dichloro-5,5-dimethyl hydantoin. Also useful are N-chloro-5,5-dimethyl hydantoin, N-chloro-5-methyl-5-ethyl hydantoin, 1,3-dichloro-5-methyl-5-ethyl hydantoin, 1,3-dichlorohydantoin, 1,3-dichloro-5-methyl-5-isobutyl hydantoin and the like. For economic and other reasons, low molecular weight N,N'-dichlorohydantoins are preferred.

It has been found that the chlorination reaction occurs quite readily upon heating the mixture of interpolymer and N-chlorohydantoin.

The amount of chlorine which reacts with the interpolymer during the heating step depends upon the amount of N-chlorohydantoin present in the mixture and to a lesser extent upon the time and temperature of heating. Other factors being equal, there appears to be an approximate straight line relation between the original concentration of available chlorine in the N-chlorohydantoin and the amount of chlorine present in the chlorinated rubbery interpolymer after heating. This is quite advantageous since the chlorine content of the chlorinated interpolymer derivatives can be controlled quite closely by regulating the concentration of the chlorinating agent. The chlorinated interpolymer derivatives resulting from the chlorination reaction upon heating may contain as little as 0.4 weight percent or as much as 3.5 weight percent of chlorine. Preferably the interpolymer derivatives contain from 1.0 to 2.0 weight percent for most applications and more preferably from 1.1 to 1.5 weight percent combined chlorine. Preferably within these ranges the percentage of combined chlorine is less than that which theoretically would be present if all the olefinic double bonds were completely chlorinated. In chlorinating interpolymers containing low concentrations of unsaturation, it is preferred that the chlorinated interpolymer contain at least about 10 weight percent of the original unsaturation. For adhesive applications a slightly higher chlorine content as high as 2.10 to about 3.5 weight percent may be profitably employed. When concentrations of chlorine higher than about 2.5 weight percent are employed, the interpolymer loses some of its most desirable rubbery properties as a result of polymer degradation and above 3.5 weight percent excessive degradation results.

As is apparent from the foregoing discussion, the amount of N-chlorohydantoin employed in the process of this invention will depend upon the degree of chlorination desired in the interpolymer derivative, and since the N-chlorohydantoins readily give up their chlorine atoms when heated, the amounts employed can be calculated readily by those skilled in the art. For example, 1,3-dichloro-5,5-dimethyl hydantoin contains about 36 weight percent chlorine. Therefore, if it is desired to obtain a chlorinated interpolymer derivative containing about 0.4 weight percent chlorine or 2.3 weight percent chlorine, then about 1.1 weight parts or 6.4 weight parts respectively of 1,3-dichloro-5,5-dimethyl hydantoin are employed. Similarly, 1-chloro-5,5-dimethyl hydantoin contains about 21.8 weight percent chlorine, and if interpolymer derivatives containing about 0.4 weight percent or 2.3 weight percent are desired, then about 1.9 or 10.9 weight parts of the mono-chlorohydantoin are employed. Preferably from about 1.5 or 3 to 6 weight parts of 1,3-dichloro-5,5-dimethyl hydantoin are employed in the practice of the invention, with up to about 10 weight parts employed where products of outstanding adhesive qualities are desired.

The time and temperature required to develop the chlorinated interpolymer derivative from mixtures of the isoolefin-polyolefin interpolymer and N-chlorohydantoin are interrelated and can be varied as will be obvious to the man skilled in the art. The temperature is preferably over about 170° F. so that the time to develop the derivative is not unnecessarily prolonged and extended, and may be as high as about 300° F. for shorter periods of exposure. For example, a preferred material is prepared by heating a mixture of about 4 parts of 1,3-dichloro-5,5-dimethyl hydantoin and the interpolymer which is about 1/8" thick at 200° F. for about 60 minutes or for 30 minutes at 235° F. or 5 minutes at 280° F. Thus, there may be considerable variation in the time and temperature of heating the interpolymer-N-chlorohydantoin mixtures and useful products are obtained under a variety of conditions. Useful products are prepared, for example, at about 212° F. by heating for 20, 30 and 60 minutes and also by heating, for example, at 280° F. for 5, 10 and 20 minutes. It should be noted that at a given temperature, heating beyond the minimum required to develop the chlorinated interpolymer derivative generally will cause some degradation of the interpolymer. While the optimum product is developed at the desired lowered temperatures, useful products are also obtained when developed in shorter times at higher temperatures as, for example, at temperatures over 300° F. for periods of time less than 5 minutes. It is desired that a combination of lowest temperature and shortest heating time is employed which can be readily determined by the man skilled in the art. Ordinarily this will be about 20 to 60 minutes at about 200° F. to about 250° F. with longer times required for thick stocks and shorter times at higher temperatures. Closer control, of course, must be had over mixtures heated for short periods of time at high temperatures, and processes conducted at lower temperatures are more flexible and result in more uniform products. Operations on a continuous basis where the stock is rapidly heated to higher temperatures for short exposure times are particularly valuable.

The practice of the invention and certain preferred embodiments are given in the examples which follow, which also illustrate the advantages of the improved process of the invention. All parts are parts by weight unless otherwise so indicated.

EXAMPLE I 100 parts of an isobutylene-isoprene copolymer containing about 97.5 percent isobutylene copolymerized with about 2.5 percent isoprene (standard Butyl or GR-I rubber) are placed on a two-roll rubber mill and worked until a uniform sheet appears on one roll. 4.5 parts of 1,3-dichloro-5,5-dimethyl hydantoin are then added to rolling bank and the chlorinating agent thoroughly worked into the copolymer. During the mixing period, cold water is passed through the mill rolls to keep the compounded mixture cool. The compounded mixture of chlorohydantoin and isobutylene-isoprene copolymer is then heated at 280° F. for 5 minutes by either turning steam into the mill rolls or by removing the compounded stock from the mill rolls and heating in an oven. A uniform rubbery chlorinated isobutylene-isoprene copolymer is obtained which contains about 1.62 percent bound chlorine. A portion of this derivative is compounded in the following recipe to demonstrate the physical porperties of the derivative prepared by the novel process of this invention.

Recipe

| Material | Parts |
| --- | --- |
| Chlorinated polymer | 100.0 |
| Carbon black | 50.0 |
| Zinc oxide | 5.0 |
| Stearic acid | 3.0 |
| Mercaptobenzothiazole | 0.5 |
| Tetra-methyl thiuram disulfide | 1.5 |
| Sulfur | 2.0 |

The compounded product is cured at 307° F. for 20, 30 and 90 minutes. The following stress-strain properties are obtained on the resulting vulcanizates:

| Cure Time, Minutes | 300% Modulus, p. s. i. | Tensile Strength, p. s. i. | Elongation, percent |
| --- | --- | --- | --- |
| 20 | 850 | 2,400 | 600 |
| 30 | 1,050 | 2,500 | 575 |
| 90 | 1,280 | 2,880 | 540 |

It is apparent that a useful product with outstanding stress-strain properties and no apparent degradation of the polymer is obtained when the novel process of this invention is employed as described above. To demonstrate the ability of this chlorinated derivative to form vulcanizable mixtures with natural rubber, a portion of the above derivative is compounded with natural rubber in the following recipe:

Recipe

| Material | Parts |
| --- | --- |
| Chlorinated copolymer | 70.0 |
| Natural rubber | 30.0 |
| Heptylated diphenylamines | 1.0 |
| Carbon black | 35.0 |
| Zinc oxide | 5.0 |
| Stearic acid | 1.5 |
| Mercaptobenzothiazole | 0.75 |
| Di-orthotolyl guanidine | 0.5 |
| Sulfur | 2.25 |

The compounded stock is cured at 307° F. for 20, 30 and 90 minutes and the following stress-strain properties are obtained on the vulcanizates:

| Cure Time, Minutes | 300% Modulus, p. s. i. | Tensile Strength, p. s. i. | Elongation, percent |
| --- | --- | --- | --- |
| 20 | 1,080 | 1,150 | 325 |
| 30 | 1,200 | 1,100 | 290 |
| 90 | 1,280 | 1,350 | 315 |

Similar results are obtained with other unsaturated diene rubbers.

When 100 parts of the above-described isobutylene-isoprene copolymer are mixed with 18 parts of 1,3-dichloro-5,5-dimethyl hydantoin and the mixture heated, the resulting product is excessively degraded, is very soft and sticky and extremely difficult to handle on a mill, and when compounded in the recipes given hereinbefore, no cure at all is obtained.

However, when chlorinated isoolefin-polyolefin interpolymer derivatives are prepared using the other N-chlorohydantoins described hereinbefore, in the critical amounts set forth, other isoolefin-polyolefin interpolymers and at other temperatures and times as described, extremely useful products are obtained. Stabilizers such as calcium silicate and epoxidized esters of fatty acids in amounts of about 1 to 3 percent are preferably added after the chlorinated interpolymer derivative is developed.

EXAMPLE II 1.5 parts of 1,3-dichloro-5,5-dimethyl hydantoin and 100 parts of a 97.5 percent isobutylene-2.5 percent isoprene copolymer are mixed together in an internal mixer of the Banbury type at a temperature of about 280° F. to 300° F. for 5 minutes, and a stabilizer such as calcium silicate in amount of about 2 percent added thereto. A uniform rubbery chlorinated isobutylene-isoprene copolymer is obtained which contains about 0.8 percent bound chlorine. A portion of this derivative is compounded in the first recipe given in Example I to demonstrate the physical properties of the product prepared by the novel process of this invention. The compounded product is cured at 307° F. and the following stress-strain properties are obtained on the resulting vulcanizates:

| Cure Time, Minutes | 300% Modulus, p. s. i. | Tensile Strength, p. s. i. | Elongation, percent |
|---|---|---|---|
| 15 | 500 | 2,600 | 815 |
| 30 | 700 | 2,900 | 785 |
| 45 | 750 | 2,975 | 745 |
| 60 | 800 | 2,875 | 680 |
| 75 | 850 | 3,000 | 690 |

This chlorinated interpolymer derivative readily forms a vulcanizable mixture when mixed with natural rubber. Likewise, extremely useful products are obtained by mixing in an internal mixer a rubbery isobutylene-isoprene copolymer with 5 and 6 parts of this N-chlorohydantoin and the chlorinated interpolymer derivatives developed by heating in an oven for between 30 and 60 minutes at 212° F.

The N-chlorohydantoins may be mixed with the interpolymer in the presence of compounding ingredients such as carbon black and finely-divided silica, and the interpolymer derivative obtained by heating the mixture in the presence of such compounding ingredients so long as such materials are not preferentially attacked by the liberated chlorine in preferences to addition at the olefinic double bonds of the interpolymer. Ordinarily about 10 percent more N-chlorohydantoin than the calculated requirement is employed in the presence of such ingredients.

EXAMPLE III

To illustrate the outstanding adhesive properties of chlorinated interpolymer derivatives prepared by the process of this invention, chlorinated interpolymer derivatives of a copolymer containing about 97.5 percent isobutylene and 2.5 percent isoprene are mixed with 5 and 6 parts, per 100 parts of interpolymer, of 1,3-dichloro-5,5-dimethyl hydantoin, and the chlorinated derivative developed by heating the mixture at a temperature of 280° F. for 5 minutes. These materials are compounded in the following recipe:

Recipe

| Material | Parts |
|---|---|
| Chlorinated interpolymer | 100.0 |
| Easy processing channel black | 50.0 |
| Zinc oxide | 5.0 |
| Stearic acid | 3.0 |
| Tetra-methyl thiuram disulfide | 1.5 |
| Benzothiazyl disulfide | 0.5 |
| Sulfur | 2.0 |

The compounded stock is sheeted into thin films and placed between portions of natural and Butyl rubber compositions, and the composite structure then vulcanized. These assemblies are then tested in a Cooey autographic adhesion tester and the adhesion is expressed in pounds of pull per inch of width required to separate the Butyl and natural rubber layers of the composite. A value of 42.5 pounds is required for the interpolymer derivative prepared with 5 parts of chlorohydantoin, and a value of 48.5 pounds is obtained on the sample prepared with 6 parts of chlorohydantoin. When a similar assembly is made without the chlorinated interpolymer cement layer or with a non-chlorine-containing isoolefin-polyolefin interpolymer composition, results of about 0.5 pounds pull per inch of width are obtained.

From the foregoing description of the invention, it will be seen that this novel process for making chlorinated isoolefin-polyolefin interpolymer derivatives is extremely useful and valuable. It is apparent that various embodiments and modifications of the invention, in addition to those specifically disclosed and illustrated by the examples, may be employed without departing from the spirit and scope of the invention as defined in the appended claims.

I claim:

1. In the process for chlorinating solid, plastic, isoolefin-polyolefin interpolymers the improvement which comprises intimately mixing an amount of an N-chlorohydantoin, sufficient to chlorinate the isoolefin-polyolefin interpolymer to contain from about 0.4 to 3.5 weight percent chlorine while retaining a portion of the original olefinic unsaturation of the interpolymer with a solid interpolymer containing 70 to 99 weight percent of an isoolefin containing from 4 to 8 carbon atoms and a terminal methylene group copolymerized with 1 to 30 weight percent of a polyolefinic hydrocarbon containing 4 to 18 carbon atoms and heating the mixture at a temperature and for a time sufficient to develop the chlorine-containing interpolymer derivatives.

2. In the process for chlorinating solid, rubbery, isoolefin-polyolefin interpolymers the improvement which comprises intimately mixing an amount of an N,N'-dichlorohydantoin sufficient to introduce into the interpolymer from 1.0 to 2.0 weight percent bound chlorine while retaining at least 10 percent of the original olefinic unsaturation of the interpolymer with a solid interpolymer of 90 to 99 weight percent of an isoolefinic hydrocarbon containing 4 to 8 carbon atoms and a terminal methylene group copolymerized with 1 to 10 weight percent of a polyolefinic hydrocarbon containing from 4 to 18 carbon atoms and heating the mixture for a time and temperature equivalent to heating for about 60 to 20 minutes at about 200° F. to about 250° F. whereby the chlorine-containing rubbery interpolymer derivative is developed.

3. In the process for chlorinating solid, rubbery, isoolefin-polyolefin interpolymers the improvement which comprises intimately mixing an amount of an N-chlorohydantoin sufficient to introduce into the interpolymer from 0.4 to 3.5 weight percent bound chlorine while retaining at least 10 percent of the original olefinic unsaturation of the interpolymer with a solid interpolymer of 90 to 99 weight percent of isobutylene copolymerized with 1 to 10 weight percent of a butadiene-1,3 hydrocarbon and heating the mixture for a time and temperature equivalent to heating for about 5 minutes at about 280° F. whereby the chlorine-containing rubbery interpolymer derivative is developed.

4. In the process for preparing a partially-chlorinated derivative of a rubbery interpolymer of 90 to 99 weight percent isobutylene copolymerized with 1 to 10 weight percent isoprene the improvement which comprises intimately mixing an amount of an N,N'-dichlorohydantoin sufficient to introduce into the interpolymer from 0.4 to 3.5 weight percent bound chlorine while retaining at least 10 percent of the original olefinic unsaturation of the interpolymer with the solid interpolymer and heating the mixture at a time and temperature equivalent to heating for about 5 minutes at about 280° F. whereby the chlorine-containing rubbery interpolymer derivative is developed.

5. In the process for preparing a partially-chlorinated derivative of a rubbery copolymer of about 97.5 percent isobutylene and about 2.5 percent isoprene the improvement which comprises intimately mixing about 1 to 10 weight parts of 1,3-dichloro-5,5-dimethyl hydantoin with 100 weight parts of the solid copolymer and heating the mixture at a temperature from about 200° F. to 300° F. for a time of about 60 to 5 minutes whereby the chlorine-containing rubbery interpolymer derivative is developed.

References Cited in the file of this patent

UNITED STATES PATENTS

| | | |
|---|---|---|
| 2,291,574 | Gleason | July 28, 1942 |
| 2,327,517 | Frolich | Aug. 24, 1943 |

OTHER REFERENCES

Salellas et al.: Anales assoc. quim. argentina, 38, 181–7 (1950); abstracted in C. A., 45, 2873 (1951).